(12) United States Patent
Page

(10) Patent No.: US 12,036,945 B1
(45) Date of Patent: Jul. 16, 2024

(54) RETAINER FOR PREVENTING TWISTING OF A SEATBELT

(71) Applicant: Justin Page, Anaheim Hills, CA (US)

(72) Inventor: Justin Page, Anaheim Hills, CA (US)

( * ) Notice: Subject to any disclaimer, the term of this patent is extended or adjusted under 35 U.S.C. 154(b) by 0 days.

(21) Appl. No.: 18/095,583

(22) Filed: Jan. 11, 2023

(51) Int. Cl.
*B60R 22/30* (2006.01)

(52) U.S. Cl.
CPC .................................. *B60R 22/30* (2013.01)

(58) Field of Classification Search
CPC .... B60R 22/02; B60R 2022/006; B60R 22/00
USPC ........................................ 280/801.1; 297/482
See application file for complete search history.

(56) References Cited

U.S. PATENT DOCUMENTS

| 3,291,528 | A | | 12/1966 | Sencabaugh | |
|---|---|---|---|---|---|
| 4,951,965 | A | | 8/1990 | Brown | |
| 5,080,396 | A | * | 1/1992 | Vacanti | B60R 22/024 |
| | | | | | 280/808 |
| 5,135,257 | A | * | 8/1992 | Short | B60R 22/024 |
| | | | | | 297/483 |
| 5,215,333 | A | | 6/1993 | Knight | |
| 5,584,536 | A | * | 12/1996 | White | B60R 22/00 |
| | | | | | 297/DIG. 6 |
| 5,839,793 | A | * | 11/1998 | Merrick | A44B 11/006 |
| | | | | | 24/615 |
| D407,886 | S | | 4/1999 | Marable | |
| 5,951,112 | A | | 9/1999 | Hansson | |
| 6,457,774 | B2 | * | 10/2002 | Baloga | B60N 2/2812 |
| | | | | | 297/484 |
| 8,328,289 | B2 | | 12/2012 | Tharp | |
| 9,015,949 | B2 | * | 4/2015 | Bernardo | B60R 22/105 |
| | | | | | 297/483 |
| 9,199,599 | B2 | * | 12/2015 | Yamataki | B60R 21/18 |
| 9,669,798 | B1 | * | 6/2017 | Maitland | B60R 22/00 |
| 10,023,078 | B2 | * | 7/2018 | Kitt | B60R 22/105 |
| 11,535,189 | B2 | * | 12/2022 | Wang | B60R 22/12 |
| 2005/0121967 | A1 | * | 6/2005 | Crowl | B60R 22/00 |
| | | | | | 297/482 |
| 2011/0156469 | A1 | * | 6/2011 | Carpenter | B60R 22/105 |
| | | | | | 297/482 |
| 2014/0217804 | A1 | | 8/2014 | Maemura | |
| 2018/0178749 | A1 | * | 6/2018 | Tomlinson | B60R 22/00 |

FOREIGN PATENT DOCUMENTS

| GB | 2336343 | | 10/1999 | | |
|---|---|---|---|---|---|
| WO | WO-2013170088 | A1 | * | 11/2013 | B60N 2/2809 |

* cited by examiner

*Primary Examiner* — Amy R Weisberg
*Assistant Examiner* — Caitlin Anne Miller

(57) ABSTRACT

A retainer apparatus for resisting twisting of a seatbelt near the tongue of the seatbelt includes a pair of sleeves interconnected by a connecting strap. Each sleeve has a channel for receiving a webbing of a seatbelt such that a tongue of the seatbelt is positioned between the sleeves. The retainer apparatus is resiliently flexible such that the retainer apparatus resists twisting around a vertical axis extending through the retainer apparatus.

19 Claims, 5 Drawing Sheets

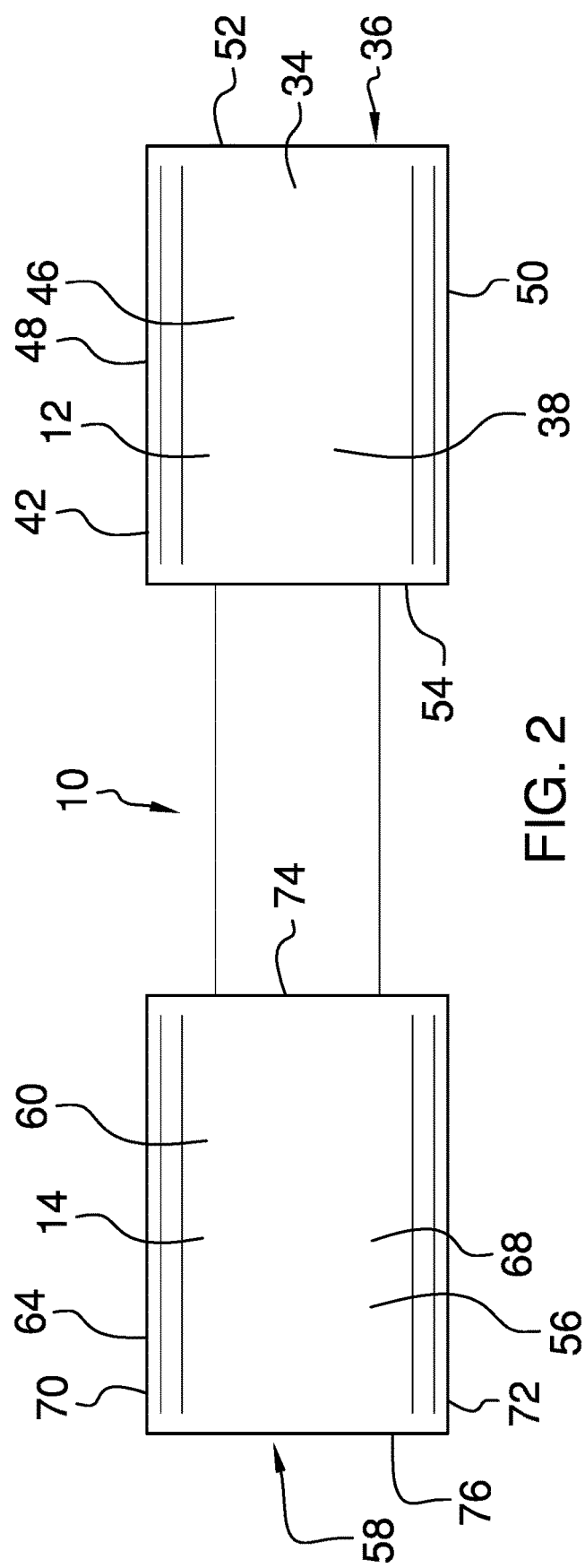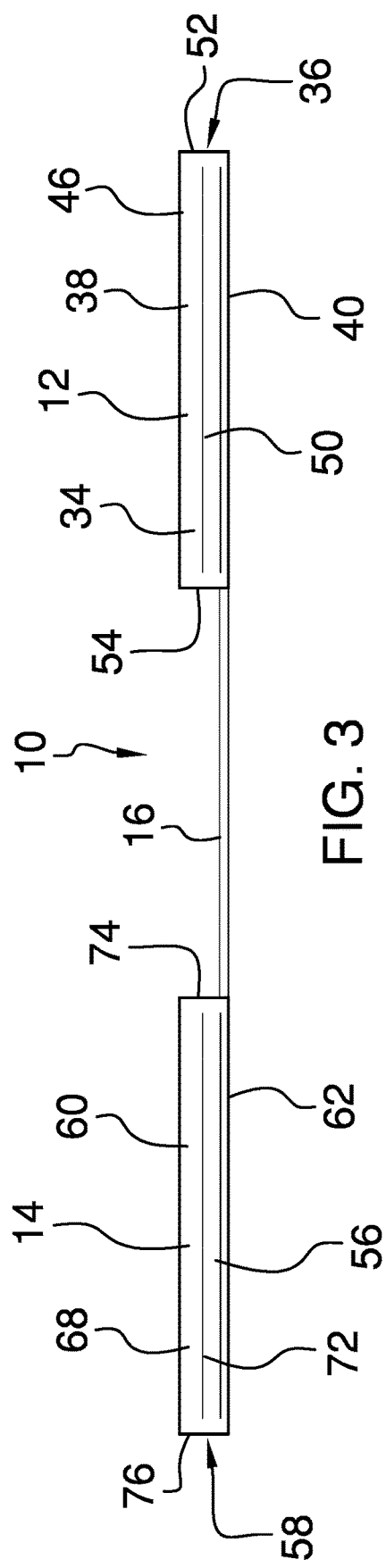

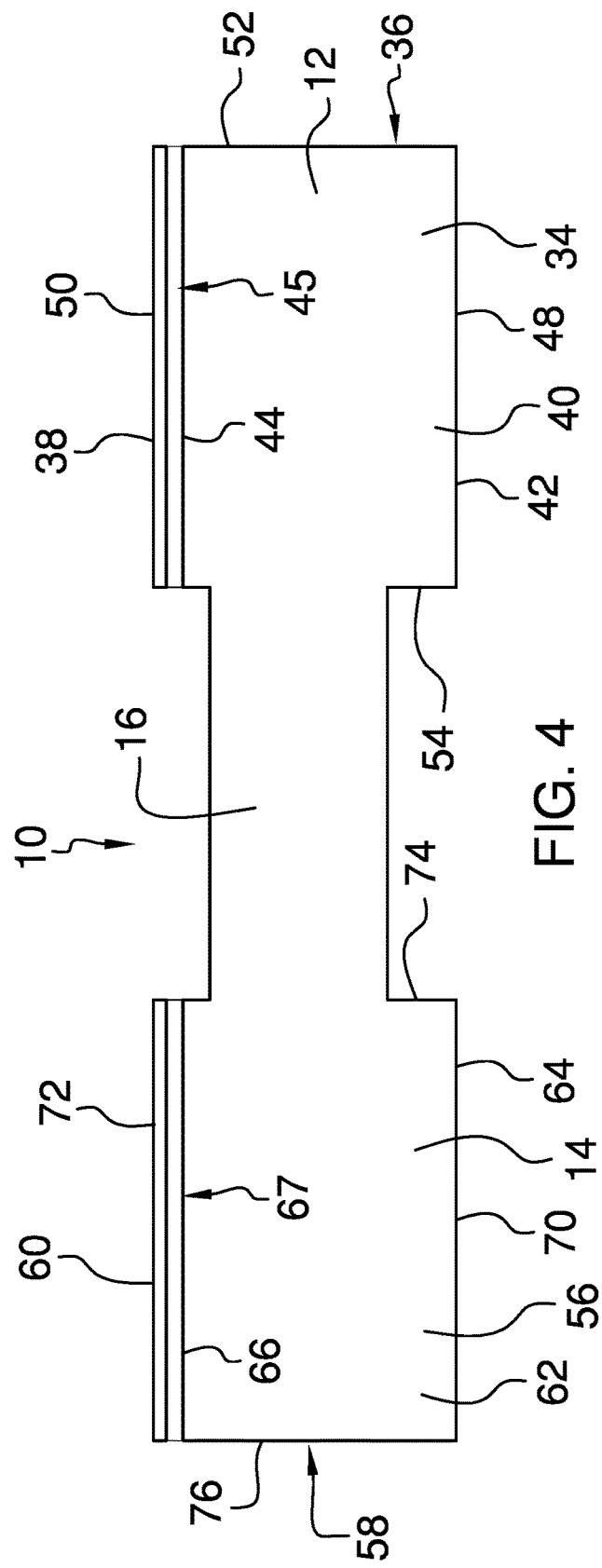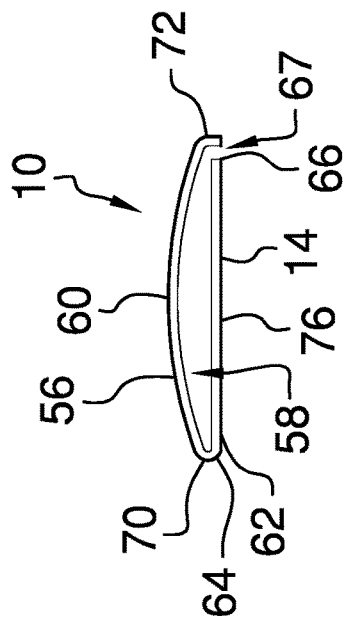

RETAINER FOR PREVENTING TWISTING OF A SEATBELT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to seatbelt retainer apparatuses and more particularly pertains to a new seatbelt retainer apparatus for resisting twisting of a seatbelt near the tongue of the seatbelt.

(2) Description of Related Art Including Information Disclosed Under 37 CFR 1.97 and 1.98

The prior art relates to seatbelt retainer apparatuses. These include, for example, sleeve apparatuses for keeping seatbelts from twisting and a rigid apparatus for maintaining a female member of a latch in a fixed position. The prior art also discloses an apparatus for keeping the seatbelts of a car seat spaced apart from each other across the seat so that a child can be positioned in the seat without trapping the seatbelts between the child and the seat. However, the prior art fails to disclose a resiliently flexible apparatus with two sleeves which are configured to be attached to a seatbelt such that a tongue of the seatbelt is positioned between the sleeves.

BRIEF SUMMARY OF THE INVENTION

An embodiment of the disclosure meets the needs presented above by generally comprising an upper sleeve has an upper outer wall and an upper channel. The upper channel extends vertically through the upper outer wall and is configured for receiving a webbing. A connecting strap is coupled to and extends downwardly from the upper sleeve. A lower sleeve is coupled to and extends downwardly from the connecting strap. The lower sleeve has a lower outer wall and a lower channel. The lower channel extends vertically through the lower outer wall and is configured for receiving the webbing. The retainer apparatus is configured for simultaneously positioning the webbing in each of the upper channel and the lower channel and a tongue of the seatbelt between the upper sleeve and the lower sleeve. The retainer apparatus is resiliently flexible such that the retainer apparatus resists twisting around a vertical axis extending through the retainer apparatus.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a side view of an embodiment of the disclosure.

FIG. 4 is a back view of an embodiment of the disclosure.

FIG. 5 is a bottom view of an embodiment of the disclosure.

DETAILED DESCRIPTION OF THE INVENTION

Figure 1:
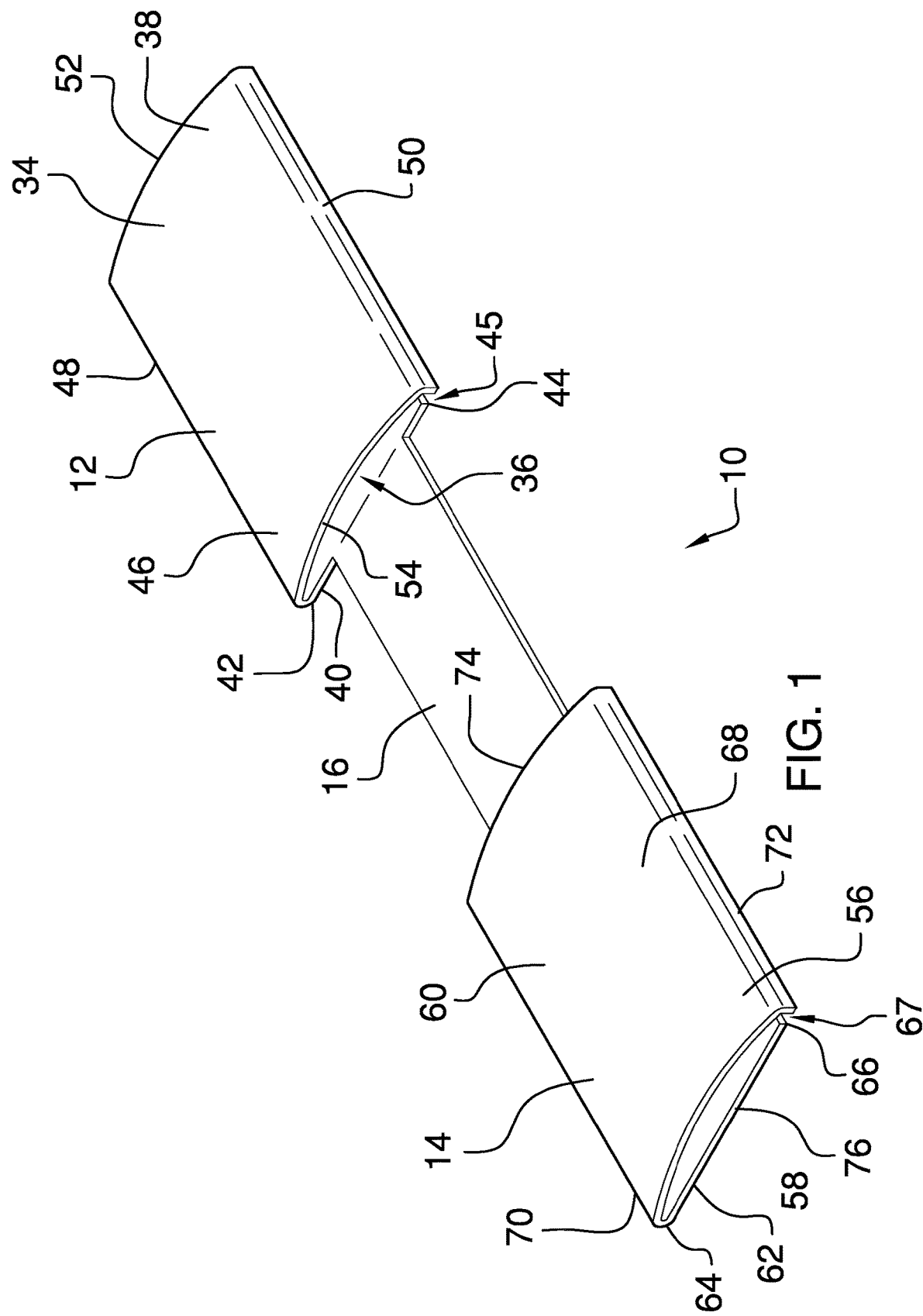
FIG. 1 is a bottom front side perspective view of a retainer apparatus according to an embodiment of the disclosure.
Figure 6:
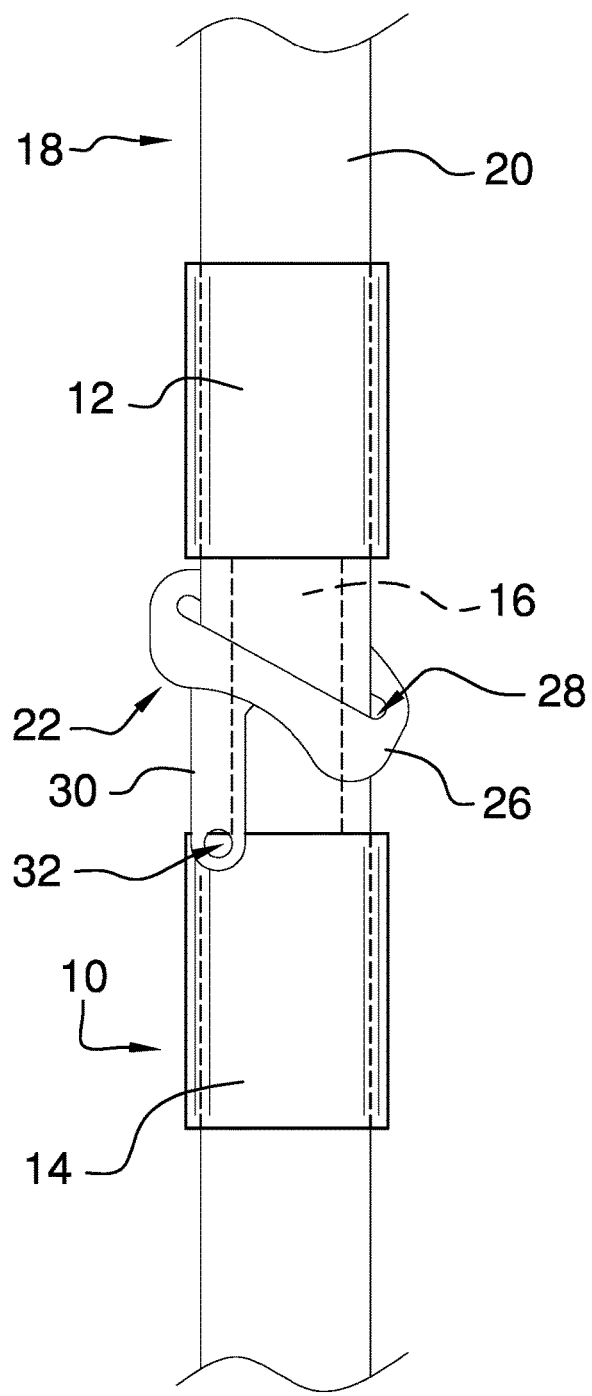
FIG. 6 is a front in-use view of an embodiment of the disclosure.
Figure 7:
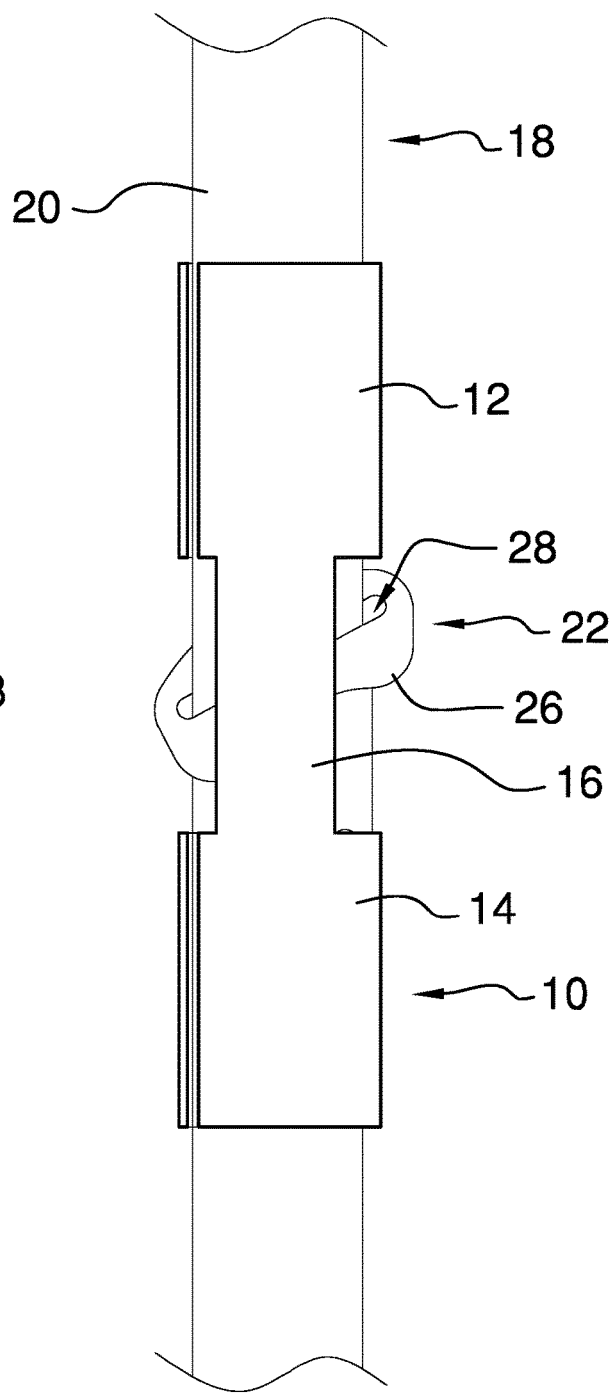
FIG. 7 is a back in-use view of an embodiment of the disclosure.
Figure 8:
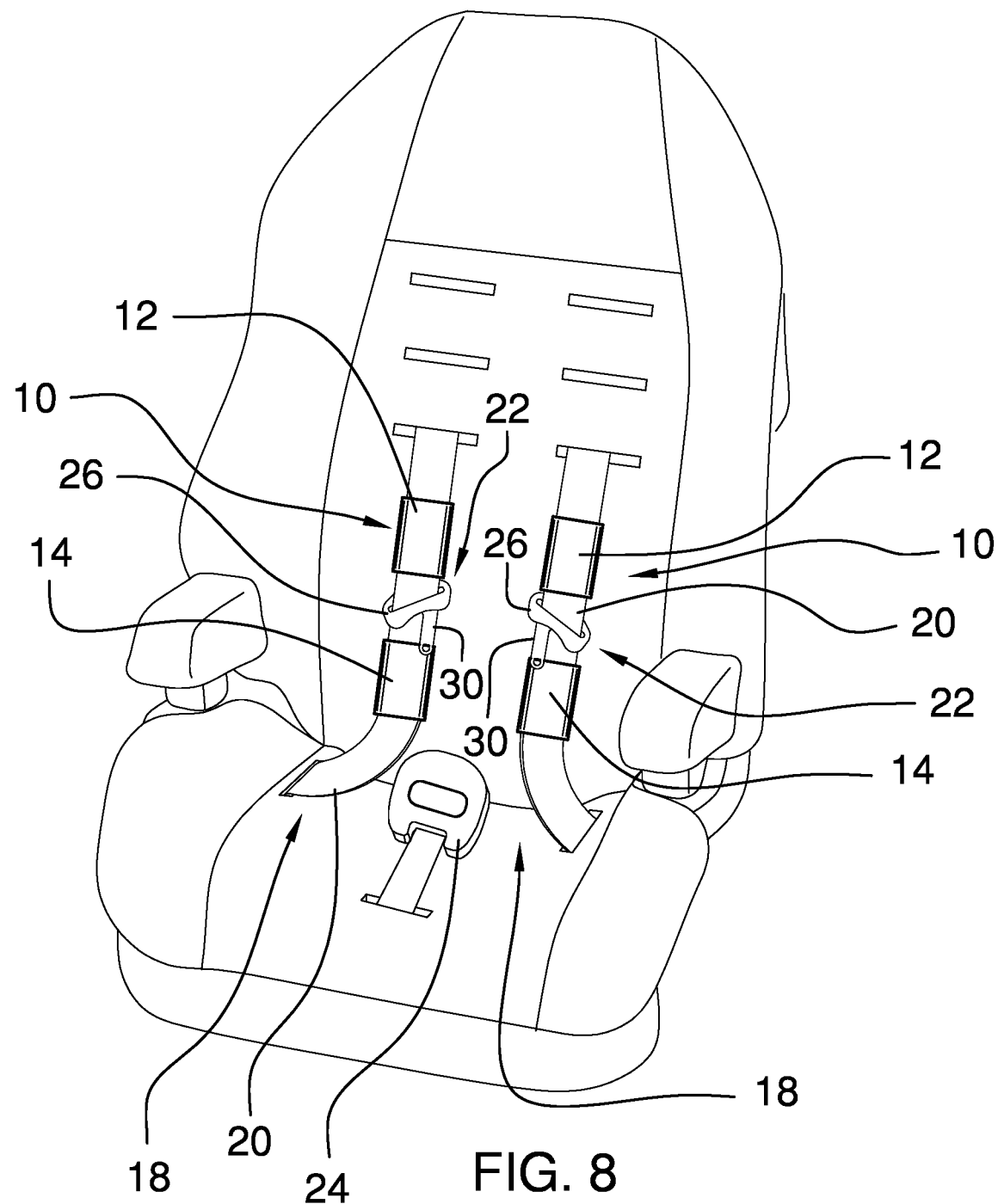
FIG. 8 is a perspective in-use view of an embodiment of the disclosure.

With reference now to the drawings, and in particular to FIGS. 1 through 8 thereof, a new seatbelt retainer apparatus embodying the principles and concepts of an embodiment of the disclosure and generally designated by the reference numeral 10 will be described.

As best illustrated in FIGS. 1 through 8, the retainer apparatus 10 generally comprises an upper sleeve 12, a lower sleeve 14, and a connecting strap 16. The upper sleeve 12 and the lower sleeve 14 are coupled to a seatbelt 18 which has a webbing 20, a tongue 22, and a latch 24. The tongue 22 has a sliding portion 26 with a slot 28 extending through the sliding portion 26. The slot 28 slidably receives the webbing 20. The tongue 22 also has a latching portion 30 with an aperture 32 extending through the latching portion 30. The latch 24 is biased to extend through the aperture 32 and engage the latching portion 30 of the tongue 22. The latch 24 is also movable to disengage the latching portion 30 of the tongue 22.

The upper sleeve 12 has an upper outer wall 34. An upper channel 36 extends vertically through the upper outer wall 34 and receives the webbing 20 of the seatbelt 18. The upper outer wall 34 includes an upper front panel 38 and an upper rear panel 40. The upper front panel 38 is coupled to a first lateral edge 42 of the upper rear panel 40 and is spaced from a second lateral edge 44 of the upper rear panel 40 to define an upper slot 28 for receiving the webbing 20 into the upper channel 36. The upper rear panel 40 is planar, and the upper front panel 38 is arcuate with a convex front surface 46. The upper sleeve 12 has a width between a first lateral side 48 of the upper sleeve 12 and a second lateral side 50 of the upper sleeve 12 of between 1.25 inches and 1.75 inches. The upper sleeve 12 has a height between a top edge 52 of the upper sleeve 12 and a bottom edge 54 of the upper sleeve 12 of between 1.75 inches and 2.25 inches.

The connecting strap 16 is coupled to and extends downwardly from the bottom edge 54 of the upper rear panel 40 of the upper sleeve 12.

The lower sleeve 14 is coupled to and extends downwardly from the connecting strap 16 and has a lower outer wall 56. A lower channel 58 extends vertically through the lower outer wall 56 and receives the webbing 20. The lower outer wall 56 includes a lower front panel 60 and a lower rear panel 62, and the lower rear panel 62 is coupled to the connecting strap 16. The lower front panel 60 is coupled to a first lateral edge 64 of the lower rear panel 62 and is spaced from a second lateral edge 66 of the lower rear panel 62 to define a lower slot 67 for receiving the webbing 20 into the lower channel 58. The lower rear panel 62 is planar, and the lower front panel 60 is arcuate with a convex front surface 68. The lower sleeve 14 has a width between a first lateral side 70 of the lower sleeve 14 and a second lateral side 72 of the lower sleeve 14 of between 1.25 inches and 1.75 inches. The lower sleeve 14 has a height between a top edge 74 of the lower sleeve 14 and a bottom edge 76 of the lower sleeve 14 of between 1.75 inches and 2.25 inches.

The webbing 20 is positioned in each of the upper channel 36 and the lower channel 58, and the tongue 22 of the seatbelt 18 is positioned between the upper sleeve 12 and the lower sleeve 14. The retainer apparatus 10 is resiliently flexible such that the retainer apparatus 10 resists twisting around a vertical axis extending through the retainer apparatus 10.

In use, the retainer apparatus 10 is coupled to the webbing 20 by positioning the webbing 20 in each of the upper channel 36 and the lower channel 58 such that the tongue 22 is positioned between the upper sleeve 12 and the lower sleeve 14. In this position, the retainer apparatus 10 resists twisting around the vertical axis.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A retainer apparatus for preventing a webbing of a seatbelt from twisting, the apparatus comprising:

an upper sleeve having an upper outer wall and an upper channel, said upper channel extending vertically through said upper outer wall, said upper channel being configured for receiving the webbing, said upper outer wall including an upper front panel and an upper rear panel, said upper channel having a thickness between said upper front panel and said upper rear panel such that said upper sleeve is configured for preventing either one of a pair of edges of the webbing from folding over a central portion of the webbing within the upper sleeve;

a connecting strap being coupled to and extending downwardly from said upper sleeve;

a lower sleeve being coupled to and extending downwardly from said connecting strap, said lower sleeve having a lower outer wall and a lower channel, said lower channel extending vertically through said lower outer wall, said lower channel being configured for receiving the webbing, said lower outer wall including an lower front panel and an lower rear panel, said lower channel having a thickness between said lower front panel and said lower rear panel such that said lower sleeve is configured for preventing either one of the pair of edges of the webbing from folding over the central portion of the webbing within the lower sleeve;

said retainer apparatus being configured for simultaneously positioning the webbing in each of said upper channel and said lower channel and a tongue of the seatbelt between said upper sleeve and said lower sleeve; and said retainer apparatus being resiliently flexible such that said retainer apparatus resists twisting around a vertical axis extending through said retainer apparatus.

2. The apparatus of claim 1, wherein said upper front panel is coupled to a first lateral edge of said upper rear panel, said upper front panel being spaced from a second lateral edge of said upper rear panel to define an upper slot, said upper slot being configured for receiving the webbing into said upper channel, said connecting strap being coupled to a bottom edge of said upper rear panel.

3. The apparatus of claim 2, wherein said upper rear panel is planar, said upper front panel being arcuate and having a convex front surface.

4. The apparatus of claim 1, wherein said upper sleeve has a width between a first lateral side of said upper sleeve and a second lateral side of said upper sleeve of between 1.25 inches and 1.75 inches.

5. The apparatus of claim 1, wherein said upper sleeve has a height between a top edge of said upper sleeve and a bottom edge of said upper sleeve of between 1.75 inches and 2.25 inches.

6. The apparatus of claim 1, wherein said lower rear panel is coupled to said connecting strap, said lower front panel being coupled to a first lateral edge of said lower rear panel, said lower front panel being spaced from a second lateral edge of said lower rear panel to define a lower slot, said lower slot being configured for receiving the webbing into said lower channel.

7. The apparatus of claim 6, wherein said lower rear panel is planar, said lower front panel being arcuate and having a convex front surface.

8. The apparatus of claim 1, wherein said lower sleeve has a width between a first lateral side of said lower sleeve and a second lateral side of said lower sleeve of between 1.25 inches and 1.75 inches.

9. The apparatus of claim 1, wherein said lower sleeve has a height between a top edge of said lower sleeve and a bottom edge of said lower sleeve of between 1.75 inches and 2.25 inches.

10. A retainer apparatus for preventing a webbing of a seatbelt from twisting, the apparatus comprising:
   an upper sleeve having an upper outer wall and an upper channel, said upper channel extending vertically through said upper outer wall, said upper channel being configured for receiving the webbing, said upper outer wall including an upper front panel and an upper rear panel, said upper channel having a thickness between said upper front panel and said upper rear panel such that said upper sleeve is configured for preventing either one of a pair of edges of the webbing from folding over a central portion of the webbing within the upper sleeve, said upper front panel being coupled to a first lateral edge of said upper rear panel, said upper front panel being spaced from a second lateral edge of said upper rear panel to define an upper slot, said upper slot being configured for receiving the webbing into said upper channel, said upper rear panel being planar, said upper front panel being arcuate and having a convex front surface, said upper sleeve having a width between a first lateral side of said upper sleeve and a second lateral side of said upper sleeve of between 1.25 inches and 1.75 inches, said upper sleeve having a height between a top edge of said upper sleeve and a bottom edge of said upper sleeve of between 1.75 inches and 2.25 inches;
   a connecting strap being coupled to and extending downwardly from said upper sleeve, said connecting strap being coupled to said bottom edge of said upper rear panel;
   a lower sleeve being coupled to and extending downwardly from said connecting strap, said lower sleeve having a lower outer wall and a lower channel, said lower channel extending vertically through said lower outer wall, said lower channel being configured for receiving the webbing, said lower outer wall including a lower front panel and a lower rear panel, said lower outer wall including an lower front panel and an lower rear panel, said lower channel having a thickness between said lower front panel and said lower rear panel such that said lower sleeve is configured for preventing either one of the pair of edges of the webbing from folding over the central portion of the webbing within the lower sleeve, said lower rear panel being coupled to said connecting strap, said lower front panel being coupled to a first lateral edge of said lower rear panel, said lower front panel being spaced from a second lateral edge of said lower rear panel to define a lower slot, said lower slot being configured for receiving the webbing into said lower channel, said lower rear panel being planar, said lower front panel being arcuate and having a convex front surface, said lower sleeve having a width between a first lateral side of said lower sleeve and a second lateral side of said lower sleeve of between 1.25 inches and 1.75 inches, said lower sleeve having a height between a top edge of said lower sleeve and a bottom edge of said lower sleeve of between 1.75 inches and 2.25 inches;
   said retainer apparatus being configured for simultaneously positioning the webbing in each of said upper channel and said lower channel and a tongue of the seatbelt between said upper sleeve and said lower sleeve; and
   said retainer apparatus being resiliently flexible such that said retainer apparatus resists twisting around a vertical axis extending through said retainer apparatus.

11. A seatbelt assembly for resisting twisting, said assembly comprising:
   a webbing;
   a tongue being slidably coupled to said webbing, said tongue having a sliding portion and a latching portion, said sliding portion having a slot extending through said sliding portion, said slot receiving said webbing, said latching portion having an aperture extending through said latching portion;
   a latch being biased to extend through said aperture and engage said latching portion of said tongue, said latch being movable to disengage said latching portion of said tongue;
   a retainer being coupled to said webbing, said retainer comprising:
      an upper sleeve having an upper outer wall and an upper channel, said upper channel extending vertically through said upper outer wall, said upper channel receiving said webbing, said upper outer wall including an upper front panel and an upper rear panel, said upper channel having a thickness between said upper front panel and said upper rear panel such that said upper sleeve prevents either one of a pair of edges of the webbing from folding over a central portion of the webbing within the upper sleeve;
      a connecting strap being coupled to and extending downwardly from said upper sleeve;
      a lower sleeve being coupled to and extending downwardly from said connecting strap, said lower sleeve having a lower outer wall and a lower channel, said lower channel extending vertically through said lower outer wall, said lower channel receiving said webbing, said lower outer wall including an lower front panel and an lower rear panel, said lower channel having a thickness between said lower front panel and said lower rear panel such that said lower sleeve prevents either one of the pair of edges of the webbing from folding over the central portion of the webbing within the lower sleeve, said tongue being positioned between said upper sleeve and said lower sleeve; and
      said retainer being resiliently flexible such that said retainer apparatus resists twisting around a vertical axis extending through said retainer apparatus.

12. The assembly of claim 11, wherein said upper front panel is coupled to a first lateral edge of said upper rear panel, said upper front panel being spaced from a second lateral edge of said upper rear panel to define an upper slot for receiving said webbing into said upper channel, said connecting strap being coupled to a bottom edge of said upper rear panel.

13. The assembly of claim 12, wherein said upper rear panel is planar, said upper front panel being arcuate and having a convex front surface.

14. The assembly of claim 11, wherein said upper sleeve has a width between a first lateral side of said upper sleeve and a second lateral side of said upper sleeve of between 1.25 inches and 1.75 inches.

15. The assembly of claim 11, wherein said upper sleeve has a height between a top edge of said upper sleeve and a bottom edge of said upper sleeve of between 1.75 inches and 2.25 inches.

16. The assembly of claim 11, wherein said lower rear panel is coupled to said connecting strap, said lower front panel being coupled to a first lateral edge of said lower rear panel, said lower front panel being spaced from a second lateral edge of said lower rear panel to define a lower slot for receiving said webbing into said lower channel.

17. The assembly of claim 16, wherein said lower rear panel is planar, said lower front panel being arcuate and having a convex front surface.

18. The assembly of claim 11, wherein said lower sleeve has a width between a first lateral side of said lower sleeve and a second lateral side of said lower sleeve of between 1.25 inches and 1.75 inches.

19. The assembly of claim 11, wherein said lower sleeve has a height between a top edge of said lower sleeve and a bottom edge of said lower sleeve of between 1.75 inches and 2.25 inches.

* * * * *